(12) United States Patent
Hatano et al.

(10) Patent No.: US 8,363,183 B2
(45) Date of Patent: Jan. 29, 2013

(54) POLARIZING PLATE, METHOD FOR PRODUCING POLARIZING PLATE, AND LIQUID CRYSTAL DISPLAY DEVICE

(75) Inventors: Taku Hatano, Tokyo (JP); Shunsuke Yamanaka, Tokyo (JP); Kouhei Arakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 359 days.

(21) Appl. No.: 12/712,625

(22) Filed: Feb. 25, 2010

(65) Prior Publication Data

US 2010/0220267 A1 Sep. 2, 2010

(30) Foreign Application Priority Data

Feb. 28, 2009 (JP) ................................. 2009-047437
May 14, 2009 (JP) ................................. 2009-117735

(51) Int. Cl.
*G02F 1/1333* (2006.01)
*G02F 1/1335* (2006.01)
*G02F 1/13* (2006.01)

(52) U.S. Cl. .......... 349/96; 349/194; 349/117; 349/118; 349/119; 349/120

(58) Field of Classification Search .................... 349/96, 349/194, 117–121
See application file for complete search history.

(56) References Cited

U.S. PATENT DOCUMENTS

| | | | |
|---|---|---|---|
| 6,124,971 A | 9/2000 | Ouderkirk et al. | |
| 7,190,354 B2 * | 3/2007 | Tanaka et al. | 345/173 |
| 7,229,695 B2 * | 6/2007 | Yoshizawa | 428/447 |
| 2006/0246233 A1 * | 11/2006 | Fukuda | 428/1.33 |
| 2007/0264447 A1 * | 11/2007 | Oya et al. | 428/1.31 |
| 2009/0079909 A1 | 3/2009 | Ouderkirk et al. | |

FOREIGN PATENT DOCUMENTS

| | | |
|---|---|---|
| WO | WO-95/17303 A1 | 6/1995 |
| WO | WO-95/17691 A1 | 6/1995 |
| WO | WO-97/01788 A1 | 1/1997 |

* cited by examiner

*Primary Examiner* — Hoan C Nguyen
(74) *Attorney, Agent, or Firm* — Birch, Stewart, Kolasch & Birch, LLP

(57) ABSTRACT

The present invention is a lengthy-shaped polarizing plate comprising a linearly-polarized light separation element, a linear light polarizing film and a protection film in this order, wherein said linearly-polarized light separation element includes a layer composed of a resin A whose inherent birefringence value is negative and has a linearly-polarized light transmission axis in a crosswise direction.

16 Claims, 2 Drawing Sheets

POLARIZING PLATE, METHOD FOR PRODUCING POLARIZING PLATE, AND LIQUID CRYSTAL DISPLAY DEVICE

CROSS-REFERENCE TO RELATED APPLICATIONS

The present application enjoys the benefit of the conventional priority claimed on the basis of the Japanese patent application number 2009-47437 filed on Feb. 28, 2009 and the Japanese patent application number 2009-117735 filed on May 14, 2009, the entire disclosure of which is incorporated herein by reference.

BACKGROUND OF THE INVENTION

1. Field of the Invention

The present invention relates to a polarizing plate, a method for producing the polarizing plate, and a liquid crystal display device. In particular the present invention relates to a polarizing plate, a method for producing the polarizing plate, and a liquid crystal display device that can be manufactured with high productivity, that can utilize light emitted from a light source with high efficiency, and that contributes to manufacture of a large display screen.

2. Description of the Related Art

A liquid crystal display device comprises a liquid crystal panel and a backlight device that illuminates this liquid crystal panel from a backside. The backlight device comprises a light reflective element, a plurality of light sources and a light diffusion plate in this order. For such light sources, a fluorescent lamp comprising a plurality of fluorescent materials having a light emission peak at wavelength regions at which humans have high color sensitivity (in particular, wavelengths at around 450, 540 and 610 nm) (i.e., a three band tube) has been widely used. In recent years, a fluorescent lamp further comprising a fluorescent material having another light emission peak at a wavelength in a region longer than 610 nm in addition to the fluorescent materials having the peaks at the conventional three wavelength regions (i.e., a four band tube) has been studied. Such a fluorescent lamp has an advantage in an enhanced color reproducibility of displayed images. However, such a lamp also has a disadvantage in high cost per one fluorescent lamp, which leads to high production cost of the entire backlight device. In recent years, there is a demand for reducing electric power consumption (energy saving) of the backlight device in terms of environmental protection, and it has been considered to reduce the number of the fluorescent lamps for use.

Under such a circumstance, in order to reduce the production cost elevation and to reduce the number of the fluorescent lamps for use aiming at energy saving, it is being practiced to dispose a brightness enhancement film on the light diffusion plate for compensating the reduced number of the fluorescent lamps. The brightness enhancement film is a member that can enhance display brightness on the liquid crystal display device. As examples therefor, Patent Documents 1 to 3 discloses those containing a linearly-polarized light separation element that allows a specific linearly-polarized light to pass therethrough and reflects a light that is linearly-polarized in an orthogonal direction with respect to the specific light.

The liquid crystal panel used in the liquid crystal display device comprises a liquid crystal cell and two linear light polarizing films that sandwich this liquid crystal cell and are disposed in a crossed Nicol pattern. Such a linear light polarizing film is usually manufactured by absorption of iodine or a dichroic dye by a polyvinyl alcohol film which is stretched in a lengthwise direction. Thus, the linear light polarizing film absorbs the light that is linearly-polarized along the film's lengthwise direction, whereas the film transmits the light that is linearly-polarized along the film's crosswise direction.

Patent Document 1: JP-Hei09-506837 A
Patent Document 2: JP-Hei11-509331 A (corresponding to U.S. Pat. No. 7,423,708)
Patent Document 3: JP-Hei09-507308 A (corresponding to U.S. Pat. No. 6,096,375)

SUMMARY OF THE INVENTION

In addition to the aforementioned energy saving, there is another demand from the market for a liquid crystal display having a further enlarged display screen. There is also a demand for further improvement on productivity in order to reduce the production cost. For example, Patent Document 1 discloses, as a brightness enhancement film, a linearly-polarized light separation element composed of a multilayer film containing an orientation layer made of a stretched polyethylene naphthalate. However, when this multilayer film is stretched in the crosswise direction in order to meet the demand for widening the width of optical films, the molecules therein are oriented in the crosswise direction. Since the inherent birefringence value of polyethylene naphthalate is positive, such a stretching results in a film having a linearly-polarized light transmission axis in the lengthwise direction of the film. Thus, when films each having a lengthy shape are laminated, the linearly-polarized light transmission axis of the linear light polarizing film is placed in an orthogonal relationship with the linearly-polarized light transmission axis of the linearly-polarized light separation element. Thus, the light from the light source can not pass therethrough at all, and the display device does not work.

As another example, Patent Document 2 discloses in Example 5 a linearly-polarized light separation element produced by preparing a multilayer film containing a layer composed of polyethylene naphthalate having a positive inherent birefringence value and a layer composed of syndiotactic polystyrene having a negative inherent birefringence value, and then stretching the multilayer film in a crosswise direction, and in such an element the layer composed of polyethylene naphthalate causes a refractive index in a stretching direction. Such a film has a high transmittance of a light polarized in a non-stretching direction as shown in a curve "a" in FIG. 6A, and therefore the lengthwise direction of the multilayer film becomes the linearly-polarized light transmission axis. Thus, when this multilayer film and the linear light polarizing film are laminated with their lengthwise directions being aligned, the linearly-polarized light transmission axis of the linear light polarizing film is placed in an orthogonal relationship with the linearly-polarized light transmission axis of the linearly-polarized light separation element, and the display device does not work.

Patent Document 3 discloses a technique in which a linearly-polarized light separation element (reflective polarizer) and a linear light polarizing film (dichroic polarizer) are simultaneously formed by stretching a multilayer film having a layer composed of polyethylene naphthalate on which a polyvinyl alcohol solution coating is formed. Employing this technique together with employing a manner of stretching to the crosswise direction, there is a possibility to realize production of a polarizing plate having a large size with a high polarization transmittance in the lengthwise direction. However, when such a technique is used, insufficiency in absorption occurs in a step of absorption of iodine or the dichroic dye by the polyvinyl alcohol layer, and contamination of the adjacent linearly-polarized light separation element occurs, by which the polarization degree of the linearly-polarized light separation element is deteriorated and the brightness is thereby reduced. Thus, the resulting product may have insufficiency in the function as the brightness enhancement film.

It is an object of the present invention to provide a polarizing plate that can be manufactured with high productivity, that can utilize light emitted from a light source with high efficiency, and that contributes to manufacture of a large display screen; and to provide a liquid crystal display device having this polarizing plate.

In order to solve the aforementioned problems, the present inventors have conducted studies and found out that the aforementioned problems can be solved by arranging a linearly-polarized light separation element having a specific nature at a specific position, and attained to the present invention based on this finding.

According to the present invention, there are provided a lengthy-shaped polarizing plate, a method for producing the lengthy-shaped polarizing plate, and a liquid crystal display device which are as follows:

(1) A lengthy-shaped polarizing plate comprising a linearly-polarized light separation element, a linear light polarizing film and a protection film in this order, wherein: said linearly-polarized light separation element includes a layer composed of a resin A whose inherent birefringence value is negative; and said linearly-polarized light separation element has a linearly-polarized light transmission axis in a crosswise direction.

(2) The polarizing plate wherein said linearly-polarized light separation element is obtained by stretching a layer composed of said resin A in the crosswise direction.

(3) The polarizing plate wherein a width thereof is 1,000 mm or more.

(4) The polarizing plate wherein said resin A is a styrene-based resin.

(5) The polarizing plate wherein said linearly-polarized light separation element is a multilayer film obtained by alternately laminating a layer composed of said resin A and a layer composed of a resin B whose refractive index is lower than that of said resin A.

(6) The polarizing plate wherein the refractive index of said resin B is 0.03 or more smaller than the refractive index of said resin A.

(7) The polarizing plate wherein 51 or more layers are laminated in said multilayer film.

(8) The polarizing plate wherein said resin B is an acryl-based resin.

(9) The polarizing plate wherein said acryl-based resin is a copolymer of alkyl (meth)acrylate ester and styrene.

(10) The polarizing plate wherein a heat deflection temperature TsB of said resin B is 10° C. or more lower than a heat deflection temperature TsA of said resin A.

(11) The polarizing plate wherein a Vicat softening temperature VstB of said resin B is 10° C. or more lower than a Vicat softening temperature VstA of said resin A.

(12) The polarizing plate wherein said resin B is a resin whose inherent birefringence value is positive.

(13) The polarizing plate wherein said resin whose inherent birefringence value is positive is polyolefin.

(14) A method for producing a lengthy-shaped polarizing plate, said method comprising: a linearly-polarized light separation element obtaining step wherein a lengthy-shaped pre-stretch film including a layer of a resin A whose inherent birefringence value is negative is stretched in its crosswise direction, to obtain a lengthy-shaped linearly-polarized light separation element having a linearly-polarized light transmission axis in its crosswise direction; and a laminating step wherein said lengthy-shaped linearly-polarized light separation element, a lengthy-shaped linear light polarizing film having a linearly-polarized light transmission axis in its crosswise direction, and a lengthy-shaped protection film, in this order, by a roll-to-roll procedure.

(15) The method for producing the lengthy-shaped polarizing plate wherein said linearly-polarized light separation element obtaining step comprises: a multilayer film obtaining step wherein said resin A and a resin B whose refractive index is lower than that of the resin A is co-extruded to obtain a multilayer film having alternately laminated layers of a layer composed of said resin A and a layer composed of said resin B; and a co-stretching step wherein said multilayer film thus obtained is co-stretched in the crosswise direction thereof.

(16) A liquid crystal display device comprising a light reflection element, a light source, a polarizing plate cut out from the aforementioned polarizing plate, a liquid crystal cell and a counter polarizer in this order.

The lengthy-shaped polarizing plate of the present invention can be utilized with the linear light polarizing film that are used in the prior art. In addition, the polarized plate of the present invention can enhance efficiency in utilizing the light emitted from the light source. When the polarizing plate is incorporated in the display device, the screen size can be enlarged (screen area can be increased). The polarizing plate of the present invention can also contribute to improvement in productivity of the polarizing plate. With the method for producing the lengthy-shaped polarizing plate of the present invention, a lengthy-shaped polarizing plate with a brightness enhancement function that has a wide width and high efficiency in light utilization can be produced continuously using the linear light polarizing film known in the prior art. Thereby the method can contribute to enhancement of the polarizing plate productivity, and can accomplish screen size enlargement (screen area can be increased) when the polarizing plate is incorporated in the display device. Since the liquid crystal display device of the present invention has the polarizing plate having high light utilization efficiency, the device can contribute to energy saving, and can accomplish screen size enlargement and productivity enhancement.

The other objects, features and advantages of the present invention are specifically set forth in or will become apparent from the following detailed descriptions of the invention.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Figure 1:
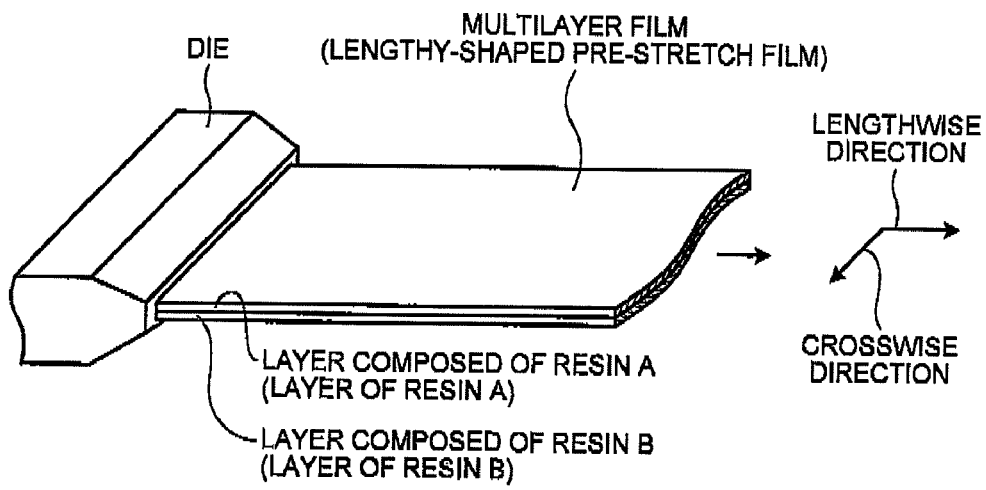
FIG. 1 is a diagram schematically illustrating a lengthy shaped multilayer film exiting a die according to an embodiment of the present invention.
Figure 2:
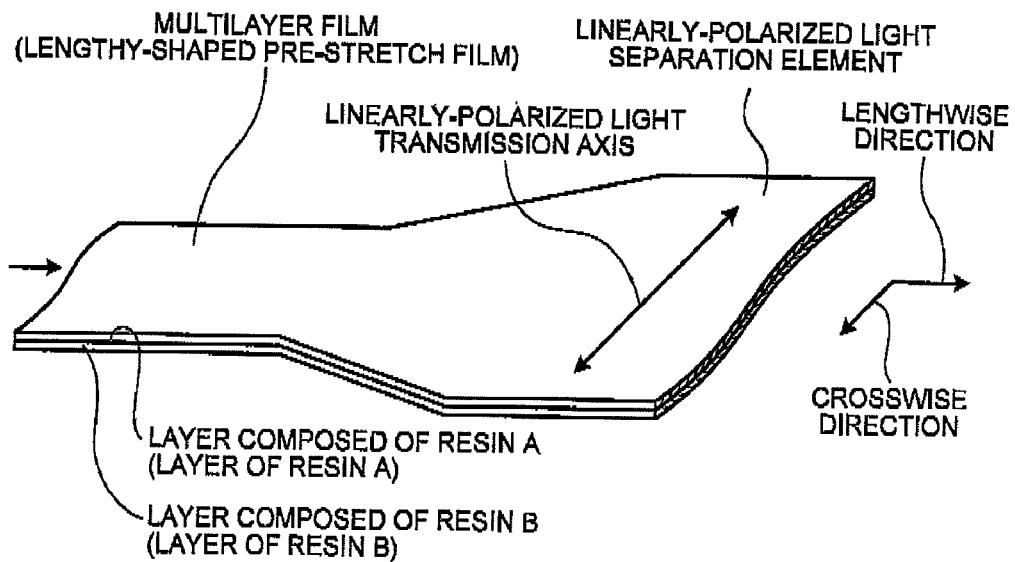
FIG. 2 is a diagram schematically illustrating a linearly-polarized light separation element according to an embodiment of the present invention.
Figure 3:
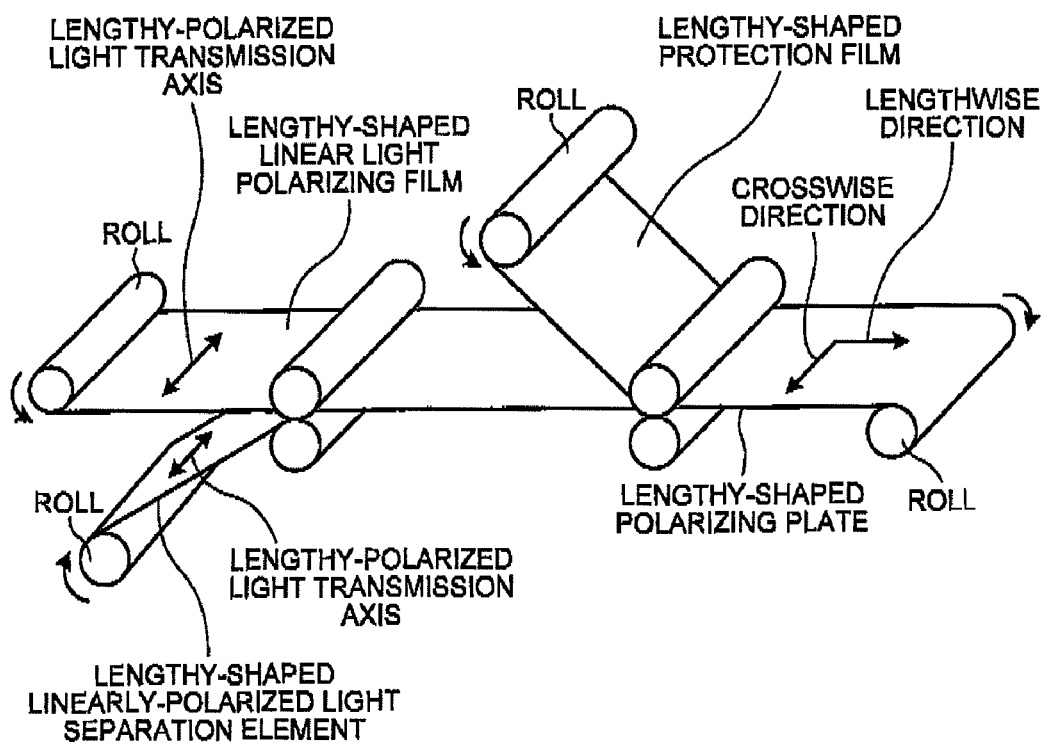
FIG. 3 is a diagram schematically illustrating a laminating step by a roll-to-roll procedure according to an embodiment of the present invention.

The polarizing plate of the present invention comprises a linearly-polarized light separation element, linear light polarizing film and a protection film in this order, and has a linearly-polarized light transmission axis in the crosswise direction.

<Linearly-Polarized Light Separation Element>

The linearly-polarized light separation element has a function of allowing a specific linearly-polarized light to pass therethrough and reflecting a light that is linearly-polarized in an orthogonal direction with respect to the specific light.

The linearly-polarized light separation element used in the present invention contains a layer composed of a resin A whose inherent birefringence value is negative. The resin whose inherent birefringence value is negative is a resin whose refractive index in stretched direction decreases when a pre-stretched molded body made of the resin is uniaxially stretched (resin in which, when a light comes in a layer made of the resin in which the polymer composing the resin is oriented in a uniaxial order, the refractive index of the light in an orientation direction is smaller than the refractive index of the light in the direction orthogonal to the orientation direction). The inherent birefringence value may also be calculated from a dielectric constant distribution.

Examples of the resin A whose inherent birefringence value is negative may include styrene-based resins containing a homopolymer of styrene or a styrene derivative or copolymers thereof with other monomers, an acrylonitrile resin, a methyl methacrylate resin, and multicomponent copolymerization polymers thereof. One species thereof may be solely used. Alternatively, a combination of two or more thereof may also be used.

The styrene-based resin is a resin having a styrene structure as a part or an entire part of its repeating unit, and examples thereof may include polystyrene, and copolymers of styrene based monomers such as styrene, α-methylstyrene, o-methylstyrene, p-methylstyrene, p-chlorostyrene, p-nitrostyrene, p-aminostyrene, p-carboxystyrene and p-phenylstyrene with other monomers such as ethylene, propylene, butadiene, isoprene, acrylonitrile, methacrylonitrile, α-chloroacrylonitrile, methyl acrylate, methyl methacrylate, ethyl acrylate, ethyl methacrylate, acrylic acid, methacrylic acid, maleic anhydride and vinyl acetate. Among them, polystyrene and the copolymer of styrene and maleic anhydride may be used suitably.

The molecular weight of the resin A is appropriately selected depending on its intended use, and is usually 10,000 to 300,000, preferably 15,000 to 250,000 and more preferably 20,000 to 200,000 as a weight mean molecular weight (Mw) in terms of polyisoprene measured by gel permeation chromatography using cyclohexane as a solvent. The glass transition temperature $Tg_a$ of the resin A is preferably 120° C. or higher, more preferably 120 to 200° C. and particularly preferably 120 to 140° C.

The heat deflection temperature TsA of the resin A is preferably 80° C. or higher, more preferably 110° C. or higher and particularly preferably 120 to 140° C. When the heat deflection temperature is in the aforementioned range, the linearly-polarized light separation element can have an improved planarity. The Vicat softening temperature Vst of the resin A is preferably 80° C. or higher, more preferably 110° C. or higher and particularly preferably 120 to 140° C. When the Vicat softening temperature is in the aforementioned range, durability and stretching workability can be improved.

In order to give durability to the resin A, the resin A may contain additives such as an antioxidant, a heat stabilizer, a light stabilizer, an ultraviolet light absorber, an infrared light absorber and an antistatic agent.

The layer composed of the resin A may be obtained by a cast molding method or an extrusion molding method. Among them, the extrusion molding method is preferable for obtaining a film having excellent size stability.

It is preferable that the linearly-polarized light separation element used in the present invention has a laminated structure of a multilayer film obtained by alternately laminating a layer composed of the resin A and a layer composed of a resin B whose refractive index is lower than that of the resin A. By having such a laminated structure, the function of separating the linearly-polarized light can be efficiently elicited. In order to efficiently elicit the function of separating linearly-polarized light, the number of laminated layers is preferably not less than 51, preferably not less than 101, more preferably not less than 5001 and particularly preferably not less than 10001.

Examples of the resin B may include acryl-based resins, polyolefin resins including polyethylene and an alicyclic structure-containing resin(s), polytetrafluoroethylene, polyvinyl alcohol and polyacrylonitrile. Among them, the acryl-based resin may be suitably used because of its low birefringency, its high adhesiveness to the resin A whose inherent birefringence value is negative (particularly a styrene-based resin), and its appropriate moisture permeability and mechanical strength.

Examples of the acryl-based resins may include homopolymers of alkyl (meth)acrylate ester such as methyl acrylate, ethyl acrylate, methyl methacrylate and ethyl methacrylate; homopolymers of alkyl (meth)acrylate in which hydrogen in the alkyl group has been substituted with a functional group such as OH, COOH and $NH_2$; and copolymers of alkyl (meth)acrylate with a vinyl-based monomer(s) having an unsaturated bond such as styrene, vinyl acetate, α,β-monoethylenic unsaturated carboxylic acid, vinyl toluene and α-methylstyrene. One species thereof may be solely used. Alternatively, a combination of two or more thereof may also be used. As the acryl resin, more preferable are those containing poly(methyl methacrylate) and poly(butyl methacrylate) as monomer units. Among them, the copolymer of alkyl (meth)acrylate ester with styrene is preferable in terms of adhesiveness to the layer composed of the resin A.

As the resin B whose refractive index is lower than that of the resin A, it is preferable to use the aforementioned resin whose inherent birefringence value is negative, although it is possible to use a resin whose inherent birefringence value is positive. In this case, an absolute value of the inherent birefringence value of the resin B can be made smaller than that of the resin A. Examples of such a resin may include polyolefin, and may preferably include polyethylene.

The glass transition temperature $Tg_b$ of the resin B is preferably 40° C. or higher and more preferably 60° C. or higher. It is preferable that the glass transition temperature $Tg_b$ is lower than the glass transition temperature $Tg_a$ of the resin A, preferably 10° C. or more lower than $Tg_a$ and particularly preferably 20° C. or more lower than $Tg_a$. The difference between $Tg_a$ and $Tg_b$ is preferably 45° C. or less, more preferably 35° C. or less and still more preferably 30° C. or less. With such a constitution, when a laminated body of the layer composed of the resin A and the layer composed of the resin B is co-stretched as described later, the refractive index of the layer composed of the resin A in the stretched direction can be efficiently brought closer to the refractive index of the resin B, while the difference between the refractive index of the layer composed of the resin A in the direction orthogonal to the stretched direction and the refractive index of the resin B can be efficiently increased. Thus, the linearly-polarized light separation function can be efficiently elicited. Thermal deterioration of the resin B can also be prevented.

The heat deflection temperature TsB of the resin B is preferably 40° C. or higher, more preferably 60° C. or higher and particularly preferably 80 to 120° C. Further it is preferable that the heat deflection temperature TsB is lower than the heat deflection temperature TsA of the resin A, more preferably 10° C. or more lower than TsA, still more preferably 15° C. or more lower than TsA and particularly preferably 20° C. or more lower than TsA. The difference between TsA and TsB is preferably 35° C. or less and more preferably 30° C. or less. By making such a constitution, when the laminated body of the layer composed of the resin A and the layer composed of the resin B is co-stretched as described later, the refractive index of the layer composed of the resin A in the stretched direction can be efficiently brought closer to the refractive index of the resin B, while the difference between the refractive index of the layer composed of the resin A in the direction orthogonal to the stretched direction and the refractive index of the resin B can be efficiently increased. Thus, the linearly-polarized light separation function can be efficiently elicited. Thermal deterioration of the resin B can also be prevented. When the difference of the heat deflection temperatures is too small, adjustment of the refractive indices of layers may become difficult. When the difference of the heat deflection temperatures is too large, the stretching of the resin A may become difficult and thus the planarity of the linearly-polarized light separation element may be reduced.

The Vicat softening temperature VstB of the resin B is preferably 40° C. or higher, more preferably 60° C. or higher and particularly preferably 80 to 120° C. It is preferable that the Vicat softening temperature VstB is lower than the Vicat softening temperature VstA of the resin A, more preferably 10° C. or more lower than VstA, still more preferably 15° C. or more lower than VstA and particularly preferably 20° C. or more lower than VstA. The difference between VstA and VstB is preferably 35° C. or less and more preferably 30° C. or less. With such a constitution, when a laminated body of the layer composed of the resin A and the layer composed of the resin B is co-stretched as described later, the refractive index of the layer composed of the resin A in the stretched direction can be efficiently brought closer to the refractive index of the resin B, while the difference between the refractive index of the layer composed of the resin A in the direction orthogonal to the stretched direction and the refractive index of the resin B can be efficiently increased. Thus, the linearly-polarized light separation function can be efficiently elicited. Also thereby the resulting element can have high durability and excellent workability.

The absolute value of the inherent birefringence value of the resin B is preferably 0.05 or less, more preferably 0.01 or less and particularly preferably 0.005 or less. The absolute value of the inherent birefringence value of the resin B is preferably 0.03 or more smaller, more preferably 0.05 or more smaller and particularly preferably 0.2 or more smaller than that of the resin A.

The refractive index of the resin B is preferably 0.01 or more smaller, more preferably 0.03 or more smaller, more preferably 0.05 or more smaller, more preferably 0.08 or more smaller, still more preferably 0.1 or more smaller and particularly preferably 0.2 or more smaller than the refractive index of the resin A.

In order to give a light resistance and a heat resistance to the resin B, the resin B may contain an antioxidant, a heat stabilizer, a light stabilizer, an ultraviolet light absorber, an infrared absorber, an antistatic agent, a surfactant and rubber particles.

The multilayer film in which the layer composed of the resin A and the layer composed of the resin B have been laminated may be obtained by a cast molding method or an extrusion molding method. Among them, the extrusion molding method (co-extrusion molding method) is preferable in terms of obtaining a film having excellent size stability.

As to the linearly-polarized light separation element, the reflection ratio of visible light (linearly-polarized light) in the lengthwise direction is preferably not less than 80%, more preferably not less than 90%, still more preferably not less than 95% and particularly preferably not less than 99%. The reflection ratio of the visible light (linearly-polarized light) in the crosswise direction is preferably 20% or less, more preferably 10% or less, still more preferably 5% or less and particularly preferably 1% or less.

When the linearly-polarized light separation element has the laminated structure in which the layer composed of the resin A and the layer composed of the resin B have been laminated, the refractive index of the layer composed of the resin B in the lengthwise direction is preferably 0.03 or more smaller, more preferably 0.05 or more smaller, more preferably 0.08 or more smaller, still more preferably 0.1 or more smaller and particularly preferably 0.2 or more smaller than the refractive index of the layer composed of the resin A in the lengthwise direction. The difference between the refractive indices of the layer composed of the resin A and the layer composed of the resin B in the crosswise direction is preferably small, more preferably 0.01 or less, still more preferably 0.005 or less and particularly preferably 0.0001 or less.

As to the linearly-polarized light separation element, the total light transmittance of the visible light (linearly-polarized light) in the crosswise direction is preferably not less than 80%, more preferably not less than 85%, still more preferably not less than 90% and particularly preferably not less than 95%. The total light transmittance may be measured in accordance with JIS K0115 using a spectrophotometer (MPC-3100 supplied from Shimadzu Corporation).

The polarization transmission axis of the linearly-polarized light separation element refers to a direction in which the transmittance becomes maximal when the polarized light having oscillation in such a direction comes in from a perpendicular direction with respect to this polarized light element.

It is preferable that the linearly-polarized light separation element has a hardness of H or harder in terms of JIS pencil hardness. This JIS pencil hardness may be adjusted by changing the type of the resin and the layer thickness of the resin. In accordance with JIS K5600-5-4, the film surface is scratched using pencils having a variety of hardness at an inclination angle of 45 degree with a load of 500 g weight applied thereon, and the hardness of the pencil that initially gives scars is taken as the JIS pencil hardness.

The linearly-polarized light separation element has a moisture permeability of preferably 10 to 100 $g/m^2 \cdot 24$ h and more preferably 30 to 60 $g/m^2 \cdot 24$ h when the thickness thereof is 100 μm. By keeping the moisture permeability within the aforementioned range, the durability and a display performance of the polarizing plate and the display device can be further improved. The moisture permeability may be measured by a cup method as described in JIS Z 0208 under the test condition of being left stand under an environment at 40° C. and 92% RH for 24 hours.

The thickness (mean thickness) of the linearly-polarized light separation element is preferably 200 μm or less. In terms of having an appropriate moisture permeability and mechanical strength, the thickness is more preferably 1 to 60 μm, still more preferably 5 to 40 μm and particularly preferably 10 to 30 μm. By keeping the thickness within the aforementioned range, the thickness of the polarizing plate and the liquid crystal display device can be reduced.

The width of the linearly-polarized light separation element is preferably not less than 1000 mm, more preferably not less than 1350 mm, still more preferably not less than 1500 mm and particularly preferably not less than 2000 mm. By keeping the width within the aforementioned range, the size of the polarizing plate and the liquid crystal display device can be enlarged.

The linearly-polarized light separation element is a lengthy-shaped film. The lengthy-shaped film is a film having a longer (e.g., 10 times or more longer) length in the lengthwise direction than the length in the crosswise direction, and specifically refers to a film having a length to an extent that the film is winded into a roll shape to be stored and transported. Such a film is obtained by performing a production process continuously in the lengthwise direction in a production line. In particular, when the linearly-polarized light separation element used for the present invention is produced in a step of preparing a pre-stretched film as a lengthy-shaped film and a step of further stretching this, it is possible to perform a part or all of these steps in a simple and efficient in-line manner.

The linearly-polarized light separation element used for the present invention has a transmission axis of the linearly-polarized light in the crosswise direction. This is a property that can be realized by efficiently eliciting the property of the resin A whose inherent birefringence value is negative. Since the transmission axis of the linearly-polarized light is in the crosswise direction, roll-to-roll lamination of the linearly-polarized light separation element with the linear light polarizing film having a transmission axis in the crosswise direction can be performed, leading to high polarization performance.

The linearly-polarized light separation element used for the present invention may be produced by a method including a step of stretching a pre-stretched lengthy-shaped film containing a layer composed of the resin A (step of obtaining the linearly-polarized light separation element). In particular, when the laminated body to be produced is the one made of the layer composed of the resin A and the layer composed of the resin B, the production may be performed by co-stretching of these layers. In order to efficiently adjust the linearly-polarized light transmission axis to be in the crosswise direction, the stretching may be performed by a process that at least includes stretching in the crosswise direction (transverse direction). In terms of obtaining a large sized polarizing plate, it is preferable to perform a transverse uniaxial stretching by a tenter.

The stretching temperature relative to the melting point or the glass transition temperature $Tg_a$ (heat deflection temperature or Vicat softening temperature) (° C.) of the resin A may suitably be selected preferably in the range of $Tg_a-5°$ C. or higher and $Tg_a+30°$ C. or lower (TsA−5° C. or higher and TsA+30° C. or lower, or VstA−5° C. or higher and VstA+30° C. or lower) and more preferably selected in the range of $Tg_a$ or higher and $Tg_a+25°$ C. or lower (TsA or higher and TsA+25° C. or lower, or VstA or higher and VsTA+25° C. or lower). By keeping the stretching temperature within the aforementioned range, the property of the resin A can be efficiently elicited, or the orientation of the layer composed of the resin B may be suppressed, so as to efficiently direct the polarization transmission axis of the linearly-polarized light separation element to the crosswise direction. The stretching temperature is preferably $Tg_b$ (TsB, VstB)+10° C. to +60° C., more preferably $Tg_b$ (TsB, VstB)+15° C. to +40° C., and still more preferably $Tg_b$ (TsB, VstB)+20° C. to +35° C. Under such a condition, the thermal deterioration of the layer composed of the resin B can be suppressed.

With appropriate selection of the constitution as described above as the linearly-polarized light separation element for the present invention, when the laminated body of the layer composed of the resin A and the layer composed of the resin B (resin whose refractive index is lower than that of the resin A) is uniaxially stretched, the refractive index in the stretched direction is decreased and the refractive index in the direction orthogonal thereto is increased in the layer composed of the resin A. Meanwhile, in the layer composed of the resin B, the change of the refractive index is scarcely observed or the refractive index in the stretching direction is slightly increased. As a result, in the obtained stretched laminated body (multilayer film in which the layer composed of the resin A and the layer composed of the resin B have been alternately laminated), the refractive index of the layer composed of the resin A and the refractive index of the layer composed of the resin B are approximately the same in the stretched direction, whereas the difference between the refractive index of the layer composed of the resin A and the refractive index of the layer composed of the resin B becomes large in the direction orthogonal to the stretching direction.

<Linear Light Polarizing Film>

The linear light polarizing film used for the present invention allows to pass therethrough one of two linearly-polarized lights that cross orthogonally. Examples thereof may include those obtained by absorption of a dichroic substance such as iodine or dichroic dye into a hydrophilic polymer film such as a polyvinyl alcohol film or an ethylene vinyl acetate partially saponified film, and subsequent uniaxial stretching; those obtained by uniaxial stretching of the aforementioned hydrophilic polymer film, and subsequent absorption of the dichroic substance; as well as polyene oriented films of dehydrated polyvinyl alcohol and dehydrochloride-treated polyvinyl chloride. The linear light polarizing film used for the present invention is a lengthy-shaped film. In this case, the transmission axis of the linear light polarizing film (axis through which one linearly-polarized light transmits) is usually in the direction parallel with the crosswise direction of this lengthy-shaped film. The thickness of the linear light polarizing film is usually 5 to 80 μm.

<Protection Film>

The protection film used for the present invention is a film for protecting the linear light polarizing film. It is preferable that this protection film comprises a layer composed of a transparent material. The transparent material refers to a material a film made of which has a total light transmittance of 80% or more. Examples of the transparent material may include norbornene resins, polyester resins, acetylcellulose such as triacetylcellulose, polyether sulfone resins, polycarbonate resins, polyamide resins, polyimide resins, polyolefin resins such as polypropylene, acryl resins, urethane resins, acrylurethane resins, epoxy resins and silicone resins. Among them, acetylcellulose and the acryl resins are preferable. The acryl resin is particularly preferable in terms of improving the durability and the display performance of the polarizing plate and the display device. It is preferable that the transparent material is thermoplastic.

Examples of the norbornene resin may include ring-opening polymers of norbornene-based monomers, ring-opening copolymers of the norbornene-based monomers with other ring-opening copolymerizable monomers, and hydrogenated products thereof; and addition polymers of the norbornene-based monomers, and addition copolymers of the norbornene-based monomers with other addition copolymerizable monomers. Among them, the hydrogenated product of the ring-opening polymer of norbornene-based monomers is the most preferable in terms of transparency. The aforementioned polymer having the alicyclic structure may be selected from, e.g., publicly known polymers disclosed in JP 2002-321302.

Examples of the acryl resin may include homopolymers of alkyl (meth)acrylate ester such as methyl acrylate, ethyl acrylate, methyl methacrylate and ethyl methacrylate; homopolymers of alkyl (meth)acrylate ester in which hydrogen in the alkyl group has been substituted with a functional group such as OH, COOH and $NH_2$ group; and copolymers of alkyl (meth)acrylate with a vinyl-based monomer having an unsaturated bond such as styrene, vinyl acetate, α,β-monoethylenic unsaturated carboxylic acid, vinyl toluene and α-methylstyrene. One species thereof may be solely used. Alternatively, a combination of two or more thereof may also be used. As the acryl resin, those containing poly(methyl methacrylate) and poly(butyl methacrylate) as monomer units are more preferable. It is preferable that the acryl resin has a glass transition temperature in the range of 80 to 120° C. It is preferable that the acryl resin has a high surface hardness when molded into the film, and specifically it is preferable that the resin has a pencil hardness (in accordance with JIS K5600-5-4 except that the test load is 500 g) of 2H or harder.

The protection film has a moisture permeability of preferably 20 to 500 $g/m^2 \cdot 24$ h, more preferably 50 to 200 $g/m^2 \cdot 24$ h and particularly preferably 120 to 170 $g/m^2 \cdot 24$ h, when the thickness thereof is 100 μm.

The protection film used for the present invention is a lengthy-shaped film. The thickness (mean thickness) of the protection film is preferably 100 μm or less, more preferably 1 to 60 μm, still more preferably 5 to 40 μm and particularly preferably 10 to 35 μm. By keeping the thickness within the aforementioned range, the thickness of the polarizing plate and the display device can be reduced.

In order to improve the handling property of the polarizing plate of the present invention, the protection film used for the present invention preferably has a laminated structure of a layer composed of the transparent material and a layer comprising another thermoplastic resin; more preferably has a laminated structure of the layer composed of the acryl resin and the layer comprising another thermoplastic resin; still more preferably has a laminated structure of the layer composed of the acryl resin, the layer comprising another thermoplastic resin and a layer comprising elastic body particles such as rubber particles; and particularly preferably has a laminated structure of the layer composed of the acryl resin and a layer comprising the methacryl resin and the elastic body particles such as rubber particles.

In the polarizing plate of the present invention, it is preferable that the linearly-polarized light separation element, the linear light polarizing film and the protection film are integrated in this order. By integrating them without placing any other member, the thickness of the polarizing plate and the display device can be reduced. The method for integrating them is not particularly limited, and examples of such a method may include a method of attaching them using an adhesive agent or a sticky agent and a method of allowing their surface in contact with plasma, and then bonding them with pressure. The adhesive agent and the sticky agent are preferably transparent as to the visible light and preferably do not generate an unnecessary phase difference. When the linearly-polarized light separation element and the linear light polarizing film are integrated, the linearly-polarized light separation element also exerts a function of protecting the linear light polarizing film, and thus it is possible to omit the protection film of the linear light polarizing film on the side close to the linearly-polarized light separation element.

The polarizing plate of the present invention is produced as follows.

First, a pre-stretched lengthy-shaped film comprising a layer of a resin A whose inherent birefringence value is negative is stretched in its crosswise direction to obtain a lengthy-shaped linearly-polarized light separation element having a linearly-polarized light transmission axis in the crosswise direction (step of obtaining linearly-polarized light separation element). The stretching method and the stretching condition are as described above. In particular, when the pre-stretched film is a multilayer film, the production may be performed by obtaining the multilayer film in which the layer composed of the resin A and a layer composed of a resin B have been alternately laminated (procedure of obtaining multilayer film), and subsequently co-stretching the obtained multilayer film in its crosswise direction (co-stretching procedure). Then, the obtained lengthy-shaped linearly-polarized light separation element, a lengthy-shaped linear light polarizing film having a linearly-polarized light transmission axis in its crosswise direction and a lengthy-shaped protection film are laminated in this order by a roll-to-roll procedure (lamination step), to thereby obtain the lengthy-shaped polarizing plate having a polarization transmission axis in the crosswise direction.

The polarizing plate of the present invention is a lengthy-shaped film. When such a lengthy-shaped polarizing plate is used for the liquid crystal display device as will be described later, the plate enables efficient cutting out of pieces in directions and shapes suitable for the purpose, whereby the production efficiency of the polarizing plate and the display device of the present invention can be improved.

The liquid crystal display device of the present invention comprises a light reflection element, a light source, the polarizing plate, a liquid crystal cell and a counter polarizer in this order.

The light reflection element is not particularly limited, and any of those employed in publicly known liquid crystal display devices may be used. Specifically, examples of the light reflection element may include a white plastic sheet in which a void has been formed therein, and a plastic sheet on the surface of which a white pigment such as titanium oxide has been applied.

The light source is not particularly limited, and any of the publicly known ones that are employed in liquid crystal display devices may be used. Specific examples thereof may include a cold cathode tube, a light emitting diode and an electroluminescence lamp.

The liquid crystal cell is one having a pair of glass substrates between which liquid crystal is inserted, and any of publicly known ones may be used therefor. Driving mode of the liquid crystal is not particularly limited, and examples thereof may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode and optical compensated bend (OCD) mode.

As the counter polarizer, one having the aforementioned linear light polarizing film on both surfaces of which protection films have been attached may be used. The counter polarizer may have on the surface thereof an antireflection layer, an antifouling layer and an antiglare layer.

The liquid crystal display device of the present invention may have an additional member. For example, one or two or more layers of appropriate components such as a prism array sheet, a lens array sheet, a diffusion sheet, a light diffusion plate and a light guide plate may be disposed therein at appropriate locations.

In the liquid crystal display device of the present invention, the polarizing plate of the present invention may be disposed between the light source and the liquid crystal cell. In order to improve the performance of the display device, it is preferable that the polarizing plate is disposed at a position closer to the liquid crystal cell, i.e., the polarizing plate and the liquid crystal cell are disposed without any other intervening member. Considering the improvement of a display ability of the display device, the polarizing plate of the present invention may be disposed so that the linearly-polarized light separation element is placed closer to the light source.

EXAMPLES

In the following, the present invention will be explained with reference to the Examples, although the present invention is not restricted by the following Examples.

In the present Examples and Comparative Examples, evaluations are performed in accordance with the following methods.
(Layer Thickness)

The film is embedded in an epoxy resin, then cut into slices using a microtome (product name "RUB-2100" supplied from Yamato Kogyo Co., Ltd.), and the cross sectional surface of the slice is observed using a scanning electron microscope. Thickness of each layer is measured and the mean value is calculated.
(Refractive Index of Each Layer)

Each resin is molded to be a monolayer, and its refractive index at 550 nm is measured using a prism copular (model 2010, supplied from Metricon).
(Reflection Ratio)

A spectrophotometer (MPC-3100, supplied from Shimadzu Corporation) with a polarization filter mounted on its light source is used for measuring a relative specular reflection ratio relative to an aluminium-deposited mirror, and the reflection ratio at 550 nm in the direction orthogonal to a linearly-polarized light transmission axis is calculated thereby.
(Heat Deflection Temperature)

A test piece is made in accordance with JIS K7191A, and its heat deflection temperature is measured.
(Vicat Softening Temperature)

A test piece is made in accordance with JIS K7206, and its Vicat softening temperature is measured.
(Moisture Permeability of Film)

The moisture permeability is measured in accordance with a cup method described in JIS Z 0208 under test conditions of being left stand at 40° C. and at 92% R/H for 24 hours. The unit of the moisture permeability is g/m²·24 h.

Preparative Example 1

Production of Linearly-Polarized Light Separation Element 1

Pellets of a resin A1 whose inherent birefringence value is negative (brand name "Ryulex" supplied from DIC, styrene-based resin, heat deflection temperature: 122° C., Vicat softening temperature: 126° C., refractive index: 1.58) and pellets of a resin B1 whose refractive index is lower than that of the resin A1 (brand name "Estyrene" supplied from Nippon Steel Chemical Co., Ltd., styrene-methyl methacrylate copolymer, heat deflection temperature: 79° C., Vicat softening temperature: 100° C., refractive index: 1.56) are separately melted in an extruder, and supplied to dies for co-extrusion, to form a material resin film 1 (pre-stretched film) in which A layer and B layer have been alternately laminated to constitute a structure of B1/A1/B1 . . . B1/A1/B1.

Then, the material resin film 1 is uniaxially stretched in a transverse direction using a tenter stretching machine at stretching temperature of 130° C. at a stretching ratio of 2.9 times to obtain a lengthy-shaped linearly-polarized light separation element 1 having a width of 2100 mm. In the linearly-polarized light separation element 1, the mean thickness of the layer composed of the resin A layer is 85 nm and the mean thickness of the layer composed of the resin B layer is 88 nm. In this element, the transmission axis of the linearly-polarized light is in the crosswise direction. The properties of the obtained linearly-polarized light separation element 1 are shown in Table 1.

Preparative Example 2

Production of Linearly-Polarized Light Separation Element 2

A resin A2 whose inherent birefringence value is negative (styrene-based resin, heat deflection temperature: 90° C., Vicat softening temperature: 101° C., refractive index: 1.58) is used in place of the resin A1. A resin B2 whose refractive index is lower than that of the resin A2 (polyethylene resin, heat deflection temperature: 80° C. or lower, Vicat softening temperature: 83° C., refractive index: 1.51) is used in place of the resin B1. These are separately melted in an extruder, and supplied to dies for co-extrusion, to form a material resin film 2 in which the A layer and the B layer have been alternately laminated to constitute a structure of B2/A2/B2 . . . B2/A2/B2.

Then, the material resin film 2 is uniaxially stretched in a transverse direction using a tenter stretching machine at stretching temperature of 105° C. at a stretching ratio of 3.0 times and treated with heat to obtain a lengthy-shaped linearly-polarized light separation element 2 having a width of 2100 mm. In the linearly-polarized light separation element 2, the mean thickness of the layer composed of the resin A layer is 83 nm and the mean thickness of the layer composed of the resin B layer is 88 nm. In the element, the transmission axis of the linearly-polarized light is in the crosswise direction. The properties of the obtained linearly-polarized light separation element 2 are shown in Table 1.

Preparative Example 3

Production of Stretched Multilayer Film 1

A resin A3 whose inherent birefringence value is negative (brand name "HF77", supplied from PS Japan Corporation, styrene-based resin, heat deflection temperature: 76° C., Vicat softening temperature: 94° C., refractive index: 1.58) is used in place of the resin A1. A resin B3 whose inherent birefringence value is positive (brand name "Wonderlite", supplied from Asahi Kasei Corporation, polycarbonate resin, heat deflection temperature: 128° C., Vicat softening temperature: 130° C., refractive index: 1.58) is used in place of the resin B1. These are separately melted in an extruder, and supplied to dies for co-extrusion, to form a material resin film 3 in which the A layer and the B layer have been alternately laminated to constitute a structure of B3/A3/B3 . . . B3/A3/B3.

Then, the material resin film 3 is uniaxially stretched in a transverse direction using a tenter stretching machine at stretching temperature of 139° C. at a stretching ratio of 2.8 times to obtain a lengthy-shaped, stretched multilayer film 1 having a width of 2100 mm. In the stretched multilayer film 1, the mean thickness of the layer composed of the resin A layer is 84 nm and the mean thickness of the layer composed of the resin B layer is 84 nm. In the film, the transmission axis of the linearly-polarized light is not found.

Preparative Example 4

Production of Linearly-Polarized Light Separation Element 3

A resin A4 whose inherent birefringence value is positive (polyethylene naphthalate resin, glass transition temperature 121° C., heat deflection temperature: 103° C., Vicat softening temperature: 106° C., refractive index: 1.66) is used in place of the resin A1. A resin B4 whose refractive index is lower than that of the resin A4 and whose inherent birefringence value is positive (co-polyethylene naphthalate resin, glass transition temperature 95° C., heat deflection temperature: 76° C., Vicat softening temperature: 79° C., refractive index: 1.64) is used in place of the resin B1. These are separately melted in an extruder, and supplied to dies for co-extrusion, to form a material resin film 4 in which the A layer and the B layer have been alternately laminated to constitute a structure of B4/A4/B4 . . . B4/A4/B4.

Then, the material resin film 4 is uniaxially stretched in a transverse direction using a tenter stretching machine at stretching temperature of 145° C. at a stretching ratio of 5.1 times and treated with heat to obtain a lengthy-shaped linearly-polarized light separation element 3 having a width of 2100 mm. In the linearly-polarized light separation element 3, the mean thickness of the layer composed of the resin A layer is 73 nm and the mean thickness of the layer composed of the resin B layer is 84 nm. In the element, the transmission axis of the linearly-polarized light is in the lengthwise direction. The properties of the obtained linearly-polarized light separation element 3 are shown in Table 1.

Preparative Example 5

Production of Protection Film 1

Pellets of an acryl resin P1 (brand name "Delpet 980N" supplied from Asahi Kasei Corporation) and pellets of another thermoplastic resin P2 (brand name "Sumipex HT55X" supplied from Sumitomo Chemical Co., Ltd., methyl methacrylate polymer containing rubber particles) are separately melted in an extruder, and supplied to dies for the co-extrusion, to form a lengthy-shaped protection film 1 having a trilayer structure of P2/P1/P2. The properties of the protection film 1 are shown in Table 1.

Preparative Example 6

Production of Protection Film 2

Pellets of an acryl resin P3 (brand name "Sumipex HT25X" supplied from Sumitomo Chemical Co., Ltd., methyl methacrylate polymer) and pellets of another thermoplastic resin P4 (brand name "Dylark D332" supplied from Nova Chemicals Japan, stylene-maleic anhydride copolymer) are separately melted in an extruder, and supplied to dies for the co-extrusion, to form a lengthy-shaped protection film 2 having a trilayer structure of P3/P4/P3. The properties of the protection film 2 are shown in Table 1.

Preparative Example 7

Production of Protection Film 3

Triacetylcellulose is dissolved in a solvent, and cast molding is performed to obtain a monolayer lengthy-shaped protection film 3. The properties of the protection film 3 are shown in Table 1.

Example 1

Production of Polarizing Plate 1

The linearly-polarized light separation element 1 obtained in Preparative Example 1, a lengthy-shaped linear light polarizing film whose transmission axis is in the crosswise direction (a polyvinyl alcohol film which has absorbed iodine and then has been stretched) and the protection film 1 obtained in Preparative Example 5 are attached by a roll-to-roll procedure via an adhesive layer to obtain a wound roll 1 which is a polarizing plate having a layer constitution of (linearly-polarized light separation element)-(linear light polarizing film)-(protection film).

<Production of Liquid Crystal Display Device 1>

A commercially available liquid crystal display device (37-inch AQUOS, supplied from Sharp Corporation) is disassembled. The polarizing plate on a backlight side is replaced with the polarizing plate 1 which is a cut-out piece from the wound roll 1, and the device is reassembled so that the linearly-polarized light separation element is placed on the backlight side, to obtain a liquid crystal display device 1. This liquid crystal display device has a light reflection element, a light source, a light diffusion element, the polarizing plate 1, a liquid crystal cell and a polarizing plate (counter polarizer) in this order as main constituents.

The liquid crystal display device 1 thus obtained is left stand at 40° C. at 95% RH while keeping the backlight lamps turned on, as a constant temperature constant humidity test. When 700 hours have passed since the commencement of the test, the state of the display screen on the liquid crystal display device is visually observed, and it is confirmed that the device can display a uniform black image. No partial removal of the film is observed on edges of the polarizing plate 1. When the display property of the liquid crystal display device 1 is visually observed, no color unevenness is found throughout the width and a good display property is obtained. The brightness thereof is better than the comparative article (in which the linearly-polarized light separation element 1 of the polarizing plate 1 has been replaced with the protection film 3).

Example 2

Production of Polarizing Plate 2

A wound roll 2 of a polarizing plate is obtained by the same operation as in Example 1, except that the linearly-polarized light separation element 1 is replaced with the linearly-polarized light separation element 2 obtained in Preparative Example 2 and the protection film 1 is replaced with the protection film 2 obtained in Preparative Example 6.

<Production of Liquid Crystal Display Device 2>

A liquid crystal display device 2 is obtained by the same operation as in Example 1, except that the polarizing plate 1 is replaced with the polarizing plate 2 which is a cut-out piece from the wound roll 2. The liquid crystal display device 2 thus obtained is left stand at 40° C. at 95% RH while keeping the backlight lamps turned on, as a constant temperature constant humidity test. When 700 hours have passed since the commencement of the test, the state of the display screen on the liquid crystal display device is visually observed, and it is confirmed that the device can display a uniform black image. No partial removal of the film is observed on edges of the polarizing plate 2. When the display property of the liquid crystal display device 2 is visually observed, no color unevenness is found throughout the width and a good display property is obtained. The brightness thereof is better than the aforementioned comparative article.

Comparative Example 1

A wound roll 3 is obtained by the same operation as in Example 1, except that the linearly-polarized light separation element 1 is replaced with the stretched multilayer film 3 obtained in Preparative Example 3.

A liquid crystal display device 3 is obtained by the same operation as in Example 1, except that the polarizing plate 1 is replaced with the laminated body 1 which is a cut-out piece from the wound roll 3. The liquid crystal display device 3 thus obtained is left stand at 40° C. at 95% RH while keeping the backlight lamps turned on, as a constant temperature constant humidity test. When 700 hours have passed since the commencement of the test, the state of the display screen on the liquid crystal display device is visually observed, and good display image is not confirmed. No partial removal of the film is observed on edges of the laminated body 1. The brightness thereof is reduced when compared to that of the aforementioned comparative article.

Comparative Example 2

A wound roll 4 is obtained by the same operation as in Example 1, except that the linearly-polarized light separation element 1 is replaced with the linearly-polarized light separation element 3 obtained in Preparative Example 4, and the protection film 1 is replaced with the protection film 3 obtained in Preparative Example 7.

A liquid crystal display device 4 is obtained by the same operation as in Example 1, except that the polarizing plate 1 is replaced with the laminated body 2 which is a cut-out piece from the wound roll 4. The liquid crystal display device 4 thus obtained is left stand at 40° C. at 95% RH while keeping the backlight lamps turned on, as a constant temperature constant humidity test. When 700 hours have passed since the commencement of the test, the state of the display screen on the liquid crystal display device is visually observed, and good display image is not confirmed. Partial removal of the film is observed on edges of the laminated body 2. The brightness thereof is reduced (completely dark) when compared to that of the aforementioned comparative article.

TABLE 1

|  |  | Ex. 1 | Ex. 2 | Comp. Ex. 1 | Comp. Ex. 2 |
|---|---|---|---|---|---|
| Stretched multilayer film/ linearly-polarized light separation element |  | Element 1 | Element 2 | Film 1 | Element 3 |
| Properties | A layer mean thickness (nm) | 85 | 83 | 84 | 73 |
|  | B layer mean thickness (nm) | 88 | 88 | 84 | 84 |
|  | Reflection ratio (%) | 99 | 99 | — | 99 |
| Protection film |  | Film 1 | Film 2 | Film 1 | Film 3 |
| Properties | Moisture permeability (g/m^2 · day) | 145 | 45 | 145 | 365 |
|  | Thickness (μm) | 33 | 36 | 33 | 39 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims along with their full scope of equivalents.

What is claimed is:

1. A lengthy-shaped polarizing plate comprising a linearly-polarized light separation element, a linear light polarizing film and a protection film in this order, wherein:
    said linearly-polarized light separation element includes a layer composed of a resin A whose inherent birefringence value is negative; and
    said linearly-polarized light separation element has a linearly-polarized light transmission axis in a crosswise direction,
    wherein a lengthy-shaped linearly polarized light separation element, a lengthy-shaped linear light polarizing film having a linearly-polarized light transmission axis in its crosswise direction, and a lengthy-shaped protection film are laminated, in this order, by a roll-to-roll procedure to attain said lengthy-shaped linear polarizing plate in the lengthwise direction.

2. The polarizing plate according to claim 1, wherein said linearly-polarized light separation element is obtained by stretching a layer composed of said resin A in the crosswise direction.

3. The polarizing plate according to claim 1, wherein a width thereof is 1,000 mm or more.

4. The polarizing plate according to claim 1, wherein said resin A is a styrene-based resin.

5. The polarizing plate according to claim 1, wherein said linearly-polarized light separation element is a multilayer film obtained by alternately laminating a layer composed of said resin A and a layer composed of a resin B whose refractive index is lower than that of said resin A.

6. The polarizing plate according to claim 5, wherein the refractive index of said resin B is 0.03 or more smaller than the refractive index of said resin A.

7. The polarizing plate according to claim 5, wherein 51 or more layers are laminated in said multilayer film.

8. The polarizing plate according to claim 5, wherein said resin B is an acryl-based resin.

9. The polarizing plate according to claim 8, wherein said acryl-based resin is a copolymer of alkyl (meth)acrylate ester and styrene.

10. The polarizing plate according to claim 5, wherein a heat deflection temperature TsB of said resin B is 10° C. or more lower than a heat deflection temperature TsA of said resin A.

11. The polarizing plate according to claim 5, wherein a Vicat softening temperature VstB of said resin B is 10° C. or more lower than a Vicat softening temperature VstA of said resin A.

12. The polarizing plate according to claim 5, wherein said resin B is a resin whose inherent birefringence value is positive.

13. The polarizing plate according to claim 12, wherein said resin whose inherent birefringence value is positive is polyolefin.

14. A liquid crystal display device comprising a light reflection element, a light source, a polarizing plate cut out from the polarizing plate according to claim 1, a liquid crystal cell and a counter polarizer in this order.

15. A method for producing a lengthy-shaped polarizing plate, said method comprising:
   a linearly-polarized light separation element obtaining step wherein a lengthy-shaped pre-stretch film including a layer of a resin A whose inherent birefringence value is negative is stretched in its crosswise direction, to obtain a lengthy-shaped linearly-polarized light separation element having a linearly-polarized light transmission axis in its crosswise direction; and
   a laminating step wherein said lengthy-shaped linearly-polarized light separation element, a lengthy-shaped linear light polarizing film having a linearly-polarized light transmission axis in its crosswise direction, and a lengthy-shaped protection film, are laminated in this order, by a roll-to-roll procedure, thereby attaining said lengthy-shaped polarizing plate in the lengthwise direction.

16. The method for producing the lengthy-shaped polarizing plate according to claim 15, wherein said linearly-polarized light separation element obtaining step comprises:
   a multilayer film obtaining step wherein said resin A and a resin B whose refractive index is lower than that of the resin A is co-extruded to obtain a multilayer film having alternately laminated layers of a layer composed of said resin A and a layer composed of said resin B; and
   a co-stretching step wherein said multilayer film thus obtained is co-stretched in the crosswise direction thereof.

* * * * *